3,080,392
2-FLUORO-Δ¹ AND Δ¹,⁴-ANDROSTENES
John Edwards and Howard J. Ringold, Mexico City, Mexico, assignors, by mesne assignments, to Syntex Corporation, a corporation of Panama
No Drawing. Filed Apr. 6, 1960, Ser. No. 20,272
Claims priority, application Mexico June 1, 1959
27 Claims. (Cl. 260—397.4)

The present invention relates to novel cyclopentanophenanthrene compounds and to a novel process for the production thereof.

More particularly the invention relates to novel 2-fluoro-Δ¹-3-keto androstenes and 2-fluoro-Δ¹,⁴-3-keto androstadienes which may also contain oxygenation at C–11 and halogen at C–9α. The novel compounds of the present invention also include 2-fluoro-Δ¹-androstenes of the 19-nor series as well as 2-fluoro-Δ¹-androstenes which have a hydroxyl or acyloxy group at C–3.

The novel compounds of the present invention are potent hormones which exhibit valuable thereapeutic properties. The 2-fluoro compounds of the present invention exhibit anti-estrogenic, anti-androgenic and anti-gonadotrophic activity. The 2-fluoro compounds unsubstituted at C–17α or substituted with a 17α-alkyl group also have a favorable anabolic-androgenic ratio.

The novel compounds of the present invention may be represented by the following formulae:

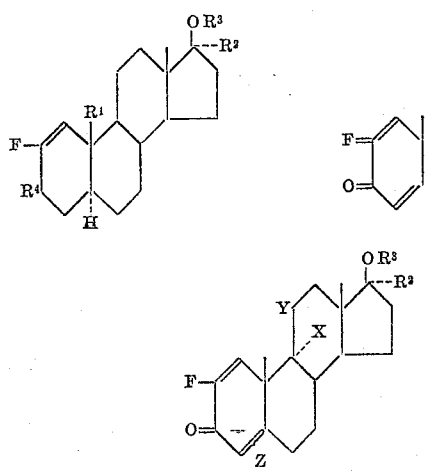

In the above formulae, R¹ represents hydrogen or methyl. R² represents hdrogyen or an alkyl radical which contains from 1 to 8 carbon atoms. R³ represents hydrogen or an acyl group. R⁴ represents keto, β-hydroxy, α-hydroxy or a β-acyloxy group. Y represents keto or β-hydroxy; X represents hydrogen or fluorine. Z indicates a double bond between C–4 and C–5 or a saturated linkage between C–4 and C–5. When Z represents a saturated linkage, rings A and B are in trans-position.

The acyl groups may be derived from monocarboxylic or polycarboxylic acids containing from 1 to 12 carbon atoms and may be saturated or unsaturated, straight chain or branched chain aliphatic, cyclic or mixed cyclic aliphatic and may be substituted as by hydroxy, acyloxy containing from 1 to 12 carbon atoms, alkoxy containing from 1 to 5 carbon atoms, amino or halogen such as bromine, chlorine or fluorine. The acyl groups may also be derived from sulfonic or sulfuric acids. Typical ester groups are the acetate, propionate, butyrate, hemisuccinate, enanthate, caproate, benzoate, aminoacetate, trimethylacetate, phenoxyacetate, sulfate, cyclopentylpropionate and β-chloropropionate. Water soluble salt derivatives such as the alkali metal salts of hemisuccinates, the disodium salt of esters formed with phosphoric acid or the hydrohalides of esters formed with amino-acids, particularly aminoacetate, are also included in the present invention.

The preparation of the novel 2-fluoro steroids of the present invention may be illustrated by the following equation insofar as rings A and B are concerned:

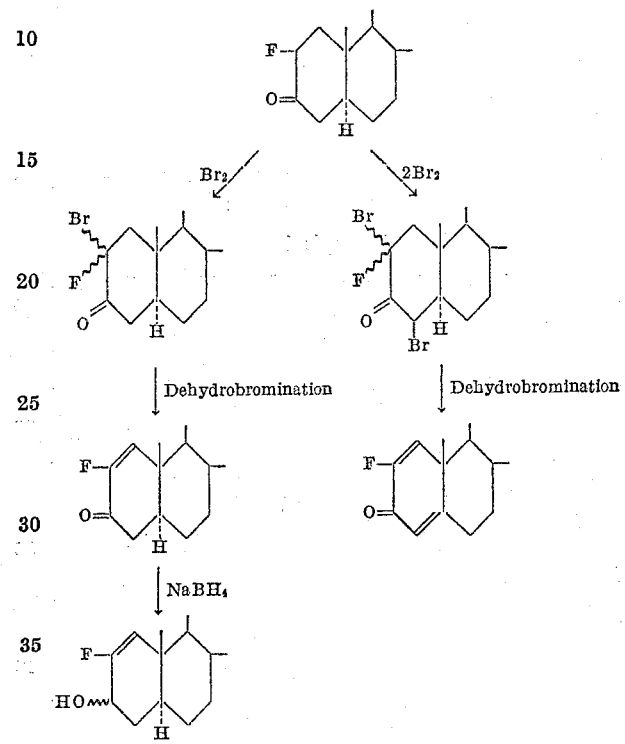

In the above equation the wavy line at C–2 and C–3 indicates α or β steric configuration for the substituents thereat.

In practicing the process above outlined a 2α-fluoro-dihydroallotestosterone (disclosed in our copending application, Serial No. 20,239 filed at even date herewith) is treated with a molar equivalent of bromine in acetic acid and sodium acetate to form a 2-bromo-2-fluoro-dihydroallotestosterone derivative which is subsequently dehydrobrominated as by treatment with calcium carbonate in dimethylformamide or dimethylacetamide, to form the corresponding 2-fluoro - Δ¹ - dihydroallotestosterone compound. The thus formed 2-fluoro-Δ¹-dihydroallotestosterone is reduced to the corresponding 3-hydroxy compound by treatment in a solvent such as tetrahydrofuran with a double metal hydride such as sodium borohydride dissolved in water; the reduction yields a mixture of the 3β and 3α compounds with the 3β compound predominating; the isomers are then separated by chromatography.

By the reaction of a 2α-fluoro-dihydroallotestosterone with 2 molar equivalents of bromine in acetic acid followed by dehydrobromination of the resulting 2-fluoro-2,4-dibromo-dihydroallotestosterone in the same manner as set forth above, there is obtained a 2-fluoro-Δ¹-testosterone.

The hydroxyl groups of the novel 2-fluoro compounds of the present invention are esterified by conventional means. The secondary hydroxyl groups at C–3 and/or C–17β of the compounds unsubstituted at C–17α are reacted with the respective carboxylic acid anhydride in pyridine; the tertiary hydroxyl group at C–17β of the compounds substituted at C–17α are preferably esterified by reaction with the respective carboxylic acid anhydride in benzene solution and in the presence of p-toluenesulfonic acid.

The 2α-fluoro compounds which serve as the starting materials in the novel process of the present invention and which are described in our aforesaid copending application are prepared by the reaction of a 2-hydroxymethylene-androstane or a 2-alkoxyoxalylandrostane with perchloryl fluoride followed by alkaline hydrolysis to form the 2α-fluoro-androstane derivative.

The novel process of the present invention can be used for steroids of the androstane series which may contain oxygenation at C-11, halogen such as fluorine at C–9α, a saturated aliphatic hydrocarbon group at C–17α, as well as for the androstanes of the 19-nor series. It was surprising to discover that the removal of the bromine group at C–2 left the fluorine moiety at C–2 as well as other groups elsewhere in the cyclopentanophenanthrene nucleus intact and unaffected.

The following examples serve to illustrate but are not intended to limit the present invention:

Example 1

To a solution of 2 g. of 2α-fluorodihydroallotestosterone, described in our copending patent application Serial No. 20,239, in 100 cc. of acetic acid was slowly added under stirring a mixture of 1 molar equivalent of bromine, 1 molar equivalent of sodium acetic and 50 cc. of acetic acid, maintaining the temperature around 20° C. The stirring was continued at room temperature until almost complete decolorization, then the mixture was poured into ice water and the precipitate was collected, washed with water and dried in vacuum. There was thus obtained 2-fluoro-2-bromo-dihydroallotestosterone.

A solution of the above compound in 20 cc. of dimethylformamide was added to a suspension of 1.5 g. of calcium carbonate in 30 cc. of boiling dimethylformamide and the mixture was then refluxed for 15 minutes, cooled, filtered, the filtrate was diluted with ice water and the precipitate was collected, washed with water, dried and recrystallized from acetone-hexane, thus furnishing 2-fluoro-1-dehydro-dihydroallotestosterone. 500 mg. of the above compound were acetylated in a conventional manner to afford the acetate of 2α-fluoro-1-dehydro-dihydroallotestosterone.

To a solution of 2 g. of the latter compound in 50 cc. of tetrahydrofuran, was slowly added with stirring a solution of 500 mg. of sodium borohydride in 10 cc. of water, maintaining the temperature around 15° C.; the stirring was continued at room temperature for 2 hours, the excess of hydride was decomposed by the cautious addition of acetic acid and the mixture was concentrated to a small volume under reduced pressure; the product was precipitated by dilution with water, and the precipitate was collected, washed with water, dried and purified by chromatography on neutral alumina, thus giving a mixture of 2-fluoro-$\Delta^1$-androstene-3β,17β-diol and 2-fluoro-$\Delta^1$-androstene-3α,17β-diol; the isomers were separated by chromatography.

The above 3β-compound was dissolved in 10 cc. of pyridine, mixed with 2 cc. of acetic anhydride and kept overnight at room temperature. After pouring into ice water it was heated for half an hour on the steam bath, cooled and the precipitate was collected, washed with water, dried and recrystallized from acetone-hexane, thus yielding the diacetate of 2-fluoro-$\Delta^1$-androstene-3β,17β-diol.

Example 2

In accordance with the method of the preceding example, 2 g. of 2α-fluoro-17α-methyl-dihydroallotestosterone described in our copending patent application Serial No. 20,239 was brominated at C-2 and then dehydrobrominated to produce 2-fluoro-17α-methyl-1-dehydro-dihydroallotestosterone.

A mixture of 1 g. of the latter compound, 40 cc. of acetic acid, 20 cc. of acetic anhydride and 1 g. of p-toluenesulfonic acid was left for 3 hours at room temperature. It was then poured into water, stirred for 1 hour and extracted with methylene chloride; the organic extract was washed with 5% sodium carbonate solution and water to neutral, dried over anhydrous sodium sulfate and evaporated to dryness under vacuo. After chromatography of the crude product on neutral alumina, the pure acetate of 2 - fluoro - 17α - methyl - 1 - dehydro - dihydroallotestosterone was obtained.

Example 3

By following the reduction method described in Example 1, 2-fluoro-17α-methyl-$\Delta^1$-dihydroallotestosterone was converted into 2-fluoro-17α-methyl-$\Delta^1$-androstene-3β,17β-diol and 2-fluoro-17α-methyl-$\Delta^1$-androstene-3α,17β-diol.

1 g. of 17α-methyl-2-fluoro-$\Delta^1$-androstene-3β,17β-diol in 50 cc. of benzene was treated with 3 g. of cyclopentylpropionic anhydride and 500 mg. of p-toluenesulfonic acid for 48 hours at room temperature; the benzene solution was then washed with 5% aqueous sodium bicarbonate solution and then with water, dried over anhydrous sodium sulfate and the solvent was evaporated. By recrystallization of the residue from acetone-hexane, there was obtained the dicyclopentylpropionate of 17α-methyl-2-fluoro-$\Delta^1$-androstene-3β,17β-diol.

500 mg. of the above compound was treated with 50 cc. of 1% methanolic potassium hydroxide for 8 hours at a temperature around 25° C.; it was then acidified with acetic acid, concentrated to a small volume, diluted with water and the precipitate was collected, washed with water, dried and recrystallized from acetone-hexane; there was thus obtained the 17-monocyclopentylpropionate of 17α-methyl-2-fluoro-$\Delta^1$-androstene-3β,17β-diol.

Example 4

In accordance with the method of Example 1, 2 g. of the benzoate of 2α-fluoro-19-nor-dihydroallotestosterone, described in our copending patent application Serial No. 20,239, was converted into the benzoate of 2-fluoro-19-nor-$\Delta^1$-dihydroallotestosterone. Saponification of the latter compound with 1% methanolic potassium hydroxide, by following the method of Example 3, gave the free 2-fluoro-19-nor-$\Delta^1$-dihydroallotestosterone. Upon treatment of the above compound with sodium borohydride in tetrahydrofuran in accordance with the method of Example 1, there were obtained 2-fluoro-19-nor-$\Delta^1$-androstene-3β,17β-diol and the corresponding 3α-isomer.

250 mg. of 2-fluoro-19-nor-$\Delta^1$-androstene-3β,17β-diol were acetylated in a conventional manner, thus producing the corresponding diacetate.

Example 5

A solution of 2 g. of the caproate of 2α-fluoro-17α-methyl-19-nor-dihydroallotestosterone, described in our copending patent application Serial No. 20,239, in 150 cc. of acetic acid was brominated in accordance with the method of Example 1 to produce 2-fluoro-2-bromo-17α-methyl-19-nor-dihydroallotestosterone caproate.

Upon treatment with calcium carbonate in dimethylformamide, there was obtained 2-fluoro-17α-methyl-19-nor-$\Delta^1$-dihydroallotestosterone caproate.

1 g. of the above compound was dissolved in 50 cc. of anhydrous tetrahydrofuran and added dropwise to a solution of 500 mg. of lithium aluminum hydride in 20 cc. of tetrahydrofuran. Aqueous saturated sodium sulfate solution was added, followed by anhydrous sodium sulfate; the solid was filtered and the solvent of the filtrate was evaporated. There was thus obtained 17α-methyl - 2 - fluoro-19-nor-$\Delta^1$-androstene-3,17β-diol as a mixture of its 3α and 3β isomers; the isomers were isolated by chromatography on neutral alumina.

A mixture of 1 g. of 17α-methyl-2-fluoro-19-nor-$\Delta^1$-androstene-3β,17β-diol and 50 cc. of benzene was treated with 1 cc. of acetic anhydride and 500 mg. of p-toluenesulfonic acid and kept at room temperature for 24 hours; the benzene solution was then washed with 5% aqueous sodium bicarbonate solution and with water to neutral, dried over anhydrous sodium sulfate and the solvent was evaporated. Recrystallization of the residue from acetone-hexane afforded the diacetate of 17α-methyl-2-fluoro-19-nor-Δ¹-androstene-3β,17β-diol.

By treatment of 500 mg. of the above compound with 50 cc. of 1% methanolic potassium hydroxide solution for 1 hour at 5° C. there was then produced the 17-monoacetate of 17α-methyl-2-fluoro-19-nor-Δ¹-androstene-3β, 17β-diol.

*Example 6*

A solution of 2 g. of 2α-fluoro-dihydroallotestosterone in 100 cc. of acetic acid was brominated, by following the procedure described in Example 1, but using 2-molar equivalents of bromine and no sodium acetate, there was thus obtained 2,4-dibromo-2-fluoro-dihydroallotestosterone.

The above tri-halo compound was refluxed for 1 hour with 50 cc. of collidine, cooled, diluted with ether and the collidine hydrobromide was removed by filtration; the filtrate was successively washed with dilute hydrochloric acid and water to neutral, dried over anhydrous sodium sulfate and the ether was evaporated. Recrystallization of the residue from acetone-hexane afforded 2-fluoro-Δ¹,⁴-androstadien-17β-ol-3-one.

A solution of 500 mg. of the above compound in 2 cc. of pyridine and 2 cc. of propionic anhydride was kept at room temperature overnight. It was then poured into ice water; the precipitate was collected and washed with water. Recrystallization from acetone-ether gave 2-fluoro-1-dehydrotestosterone propionate.

*Example 7*

In accordance with the method of the previous example, the acetate of 2α-fluoro-17α-methyldihydroallotestosterone, described in our copending patent application Serial No. 20,239, was converted into the acetate of 2-fluoro-17α-methyl-1-dehydrotestosterone.

*Example 8*

In accordance with the method of Example 1, 2 g. of 2α-fluoro - 17α - ethyl-19-nor-dihydroallotestosterone, described in our copending patent application Serial No. 20,239, was brominated at C-2 and then dehydrobrominated to produce 2-fluoro-17α-ethyl-1-dehydro-19-nor-dihydroallotestosterone.

*Example 9*

By following the method of Example 1, 2α-fluoro-11β-hydroxy-dihydroallotestosterone and 2α-fluoro-17α-methyl-11-keto-dihydroallotestosterone obtained as described in our copending patent application Serial No. 20,239 were converted respectively into 2-fluoro-11β-hydroxy-Δ¹-dihydroallotestosterone and 2-fluoro-17α-methyl-11-keto-Δ¹-dihydroallotestosterone.

*Example 10*

In accordance with the method of Example 1, 5 g. of 2α,9α-difluoro - 17α - methyl-11β-hydroxy-dihydroallotestosterone, obtained as described in our copending patent application Serial No. 20,239, was converted into 2,9α-difluoro - 17α - methyl - 11β-hydroxy-Δ¹-dihydroallotestosterone.

A solution of 2 g. of the above compound in 50 cc. of glacial acetic acid was treated dropwise with a solution of 500 mg. of chromium trioxide in 10 cc. of 50% acetic acid taking care that the temperature remained around 15° C. The reaction mixture was kept at room temperature for 1 hour, poured into ice water and the formed precipitate filtered, washed with water, dried and recrystallized from acetone-hexane, thus producing 2,9α-difluoro-17α-methyl-11-keto-Δ¹-dihydroallotestosterone. Acetylation of the above compound, in accordance with the method of Example 2 gave 2,9α-difluoro-17α-methyl-11-keto-Δ¹-dihydroallotestosterone acetate.

*Example 11*

By following the method of Example 6, 2 g. of 2α-fluoro-17α-methyl - androstan-17α-ol-3,11-dione, obtained as described in our copending patent application Serial No. 20,239 was converted into the 2,4-dibromo-derivative. Upon dehydrobromination with collidine followed by chromatography on neutral alumina, there was obtained 2-fluoro-17α-methyl-11-keto-1-dehydrotestosterone. Oxidation of the latter compound, in accordance with the method of Example 10, gave 2-fluoro-17α-methyl-11-keto-1-dehydrotestosterone.

*Example 12*

A solution of 2 g. of 2α,9α-difluoro-17α-methyl-11β-hydroxy-dihydroallotestosterone, described in our copending patent application Serial No. 20,239, in 100 ml. of dioxane was treated with 2 molar equivalents of bromine in 50 ml. of dioxane, thus producing 2,4-dibromo-2,9α-difluoro-17α-methyl - 11β - hydroxy-dihydroallotestosterone. A solution of the above compound in 20 cc. of dimethyl-acetamide was added to a suspension of 1.5 g. of calcium carbonate in 30 cc. of boiling dimethyl acetamide and the mixture was refluxed for 15 minutes, cooled, the calcium carbonate was filtered off and the filtrate was poured into ice-salt water. The formed precipitate was collected, washed with water, dried and recrystallized from methylene chloride-ether, thus furnishing 2,9α-difluoro-17α-methyl-11β-hydroxy-1-dehydrotestosterone.

500 mg. of the above compound were treated with chromium trioxide in acetic acid, in accordance with the method of Example 10, to produce 2,9α-difluoro-17α-methyl-11-keto-Δ¹-dehydrotestosterone.

*Example 13*

In accordance with the method of the previous Example, 5 g. of 2α-fluoro-17α-methyl-dihydroallotestosterone, described in our copending patent application Serial No. 20,239 were treated with 2 molar equivalents of bromine in dioxane solution and the resulting 2,4-dibromo-2-fluoro-17α - methyl-androstan-17β-ol-3-one was dehydrobrominated with calcium carbonate in dimethylacetamide, to afford 2-fluoro-17α-methyl-1-dehydrotestosterone.

We claim:
1. A compound of the following formula:

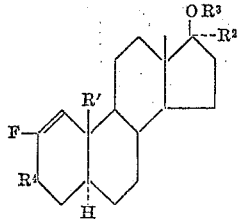

wherein R′ is selected from the group consisting of hydrogen and methyl; R² is selected from the group consisting of hydrogen and an alkyl radical containing from 1 to 8 carbon atoms; R³ is selected from the group consisting of hydrogen and a hydrocarbon carboxylic acyl group containing less than 12 carbon atoms; and R⁴ is selected from the group consisting of keto, β-hydroxy, α-hydroxy and β-acyloxy in which the acyl group is derived from a hydrocarbon carboxylic acid containing less than 12 carbon atoms.

2. 2-fluoro-Δ¹-dihydroallotestosterone.
3. 2-fluoro-17α-methyl-Δ¹-dihydroallotestosterone.
4. 2-fluoro-19-nor-Δ¹-dihydroallotestosterone.
5. 2-fluoro-Δ¹-androstene-3α,17β-diol.
6. 2-fluoro-Δ¹-androstene-3β,17β-diol.
7. 2-fluoro-17α-methyl-Δ¹-androstene-3β,17β-diol.
8. 2-fluoro-19-nor-Δ¹-androstene-3β,17β-diol.
9. The hydrocarbon carboxylic acid esters of less than 12 carbon atoms of 2-fluoro-Δ¹-dihydroallotestosterone.

10. The hydocarbon carboxylic acid esters of less than 12 carbon atoms of 2-fluoro-17α-lower alkyl Δ¹-dihydroallotestosterone.

11. The hydrocarbon carboxylic acid esters of less than 12 carbon atoms of 2-fluoro-19-nor-Δ¹-dihydroallotestosterone.

12. The hydrocarbon carboxylic acid esters of less than 12 carbon atoms of 2-fluoro-Δ¹-androstene-3,17β-diol.

13. The hydrocarbon carboxylic acid esters of less than 12 carbon atoms of 2-fluoro-19-nor-Δ¹-androstene-3,17β-diol.

14. The hydrocarbon carboxylic acid esters of less than 12 carbon atoms of 2-fluoro-17α-lower alkyl-Δ¹-androstene-3,17β-diol.

15. The hydrocarbon carboxylic acid esters of less than 12 carbon atoms of 2-fluoro-17α-lower alkyl-19-nor-Δ¹-androstene-3,17β-diol.

16. The hydrocarbon carboxylic acid esters of less than 12 carbon atoms of 2-fluoro-17α-lower alkyl-19-nor-Δ¹-dihydroallotestosterone.

17. A compound of the following formula:

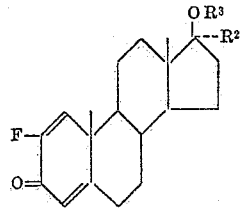

wherein R² is selected from the group consisting of hydrogen and an alkyl radical containing from 1 to 8 carbon atoms, and R³ is selected from the group consisting of hydrogen and a hydrocarbon carboxylic acyl group containing less than 12 carbon atoms.

18. 2-fluoro-Δ¹-testosterone.
19. 2-fluoro-17α-methyl-Δ¹-testosterone.
20. The hydrocarbon carboxylic acid esters of less than 12 carbon atoms of 2-fluoro-Δ¹-testosterone.
21. The hydrocarbon carboxylic acid esters of less than 12 carbon atoms 2-fluoro-17α-lower alkyl-Δ¹-testosterone.
22. A compound of the following formula:

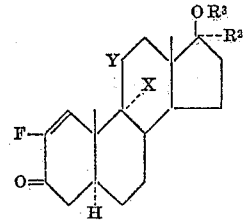

wherein R² is selected from the group consisting of hydrogen and an alkyl radical containing from 1 to 8 carbon atoms; R³ is selected from the group consisting of hydrogen and a hydrocarbon carboxylic acyl group containing less than 12 carbon atoms; Y is selected from the group consisting of keto and β-hydroxy, and X is selected from the group consisting of hydrogen and fluorine.

23. 2 - fluoro - 17α - methyl - 11 - keto - Δ¹ - dihydroallotestosterone.
24. 2-fluoro-11β-hydroxy-Δ¹-dihydroallotestosterone.
25. A compound of the following formula:

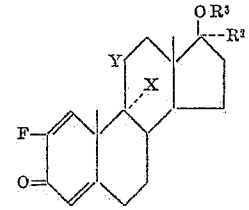

wherein R² is selected from the group consisting of hydrogen and an alkyl radical containing from 1 to 8 carbon atoms; R³ is selected from the group consisting of hydrogen and a hydrocarbon carboxylic acyl group containing less than 12 carbon atoms; Y is selected from the group consisting of keto and β-hydroxy and X is selected from the group consisting of hydrogen and fluorine.

26. 2-fluoro-11-keto-Δ¹-testosterone.
27. A compound of the formula:

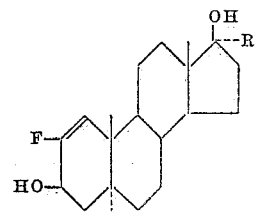

wherein R is selected from the group consisting of hydrogen and methyl.

References Cited in the file of this patent
UNITED STATES PATENTS
2,579,479    Djerassi et al. _____ Dec. 25, 1951

OTHER REFERENCES
Fieser et al.: Natural Products Related to Phenanthrene, 3rd edition (1949), pp. 262 and 264.